(No Model.)

J. H. PITMAN.
CISTERN FILTER.

No. 506,723.

Patented Oct. 17, 1893.

Witnesses
C. A. Ford.

Inventor
James H. Pitman,

By his Attorneys.

UNITED STATES PATENT OFFICE.

JAMES H. PITMAN, OF NEOLA, IOWA.

CISTERN-FILTER.

SPECIFICATION forming part of Letters Patent No. 506,723, dated October 17, 1893.

Application filed May 15, 1893. Serial No. 474,350. (No model.)

*To all whom it may concern:*

Be it known that I, JAMES H. PITMAN, a citizen of the United States, residing at Neola, in the county of Pottawattamie and State of Iowa, have invented a new and useful Cistern-Filter, of which the following is a specification.

My invention relates to improvements in filters, and is designed especially to be used in connection with cisterns or other receptacles for containing water for domestic and similar purposes, the filter being so arranged as to purify the water before entering the receptacle. The device may, however, be employed with equally good results in connection with other water supplies, the purified water being drawn or received directly from the filter.

The objects in view are to provide means whereby the leaves and other impurities which usually accumulate in a filter which is employed in the above connection may be readily removed and the interior of the filter thus cleaned without disarranging the device; and to provide means whereby, after the cessation of a rain, the body of the filter will be drained of water.

Further objects and advantages of my invention will appear hereinafter, and the novel features thereof will be particularly pointed out in the claims.

Figure 1:
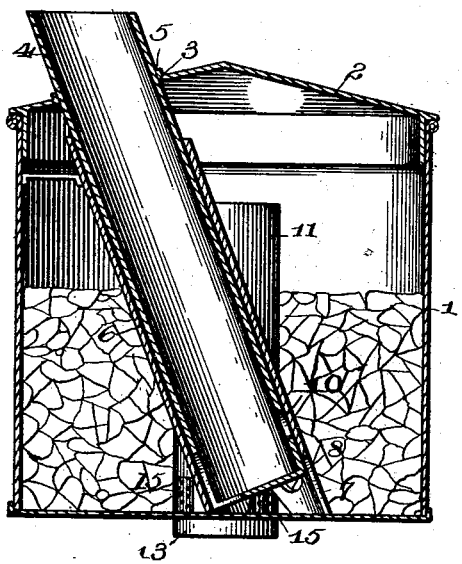
Figure 2:
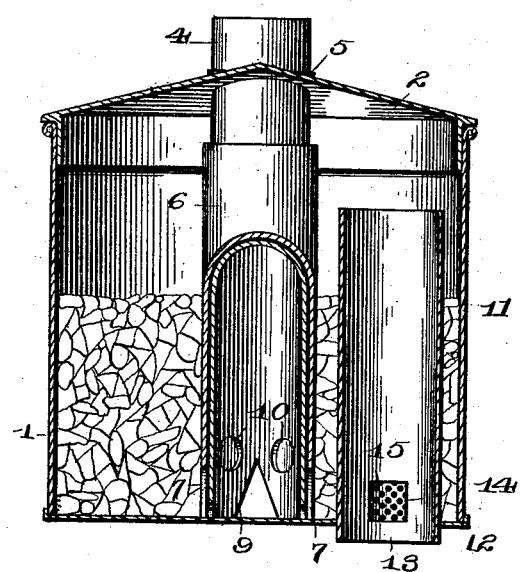
Figure 3:
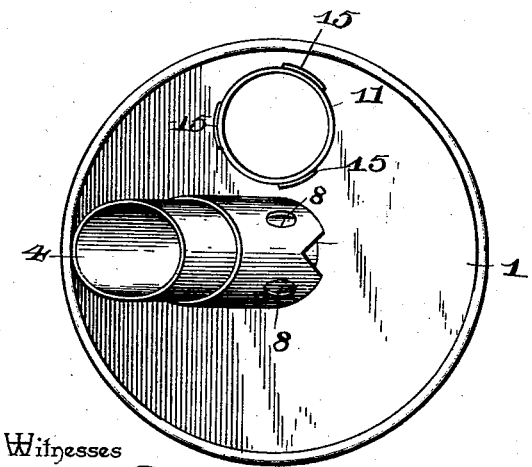
Figure 4:
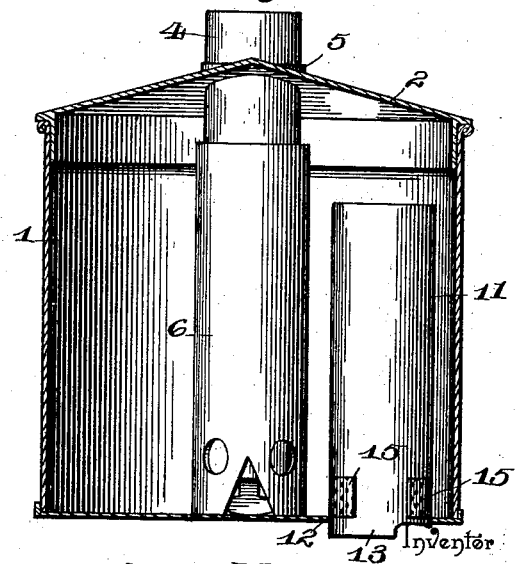

In the drawings—Figure 1 is a vertical central sectional view through the inlet pipe. Fig. 2 is a similar view at right angles to the plane upon which the section in Fig. 1 is taken. Fig. 3 is a plan view with the cap removed. Fig. 4 is a side view partly broken away to show the inlet and outlet tubes in elevation.

Similar numerals of reference indicate corresponding parts in all the figures of the drawings.

1 designates a cylindrical or other suitably shaped vessel which is provided with a removable cap 2 having, near one edge, an opening 3 for the reception of the inlet tube 4, the edges opening 3 being flanged or upstruck, as shown at 5, to lie in close contact with the sides of the inlet tube. Said inlet tube is removable from the body of the filter and is fitted in a tubular shield 6 which is disposed in an inclined position in the vessel, in registration with the opening 3 in the cap thereof. This shield is provided, at its bottom, with V-shaped openings 7 and circular openings 8, interspersed, and the lower end of the inlet tube is provided with similar openings 9 and 10 to register with those of the shield.

11 represents a vertically-disposed outlet tube which communicates at its lower end with an opening 12 in the bottom of the vessel, and is fixed permanently in said position with its upper end terminating short of the under surface of the cap. The outlet tube preferably projects slightly below the bottom of the vessel to provide a lip 13 designed for the attachment of a conductor pipe or other suitable device, when the use of such is necessary. The outlet tube is provided, furthermore, adjacent to its lower end, with openings 14 which are covered by perforated or reticulated filtering guards 15.

This being the construction of my improved filter the operation thereof is as follows: The body of the vessel being partially filled, as indicated in the drawings, with a mixture of gravel and charcoal, or any other preferred filtering or purifying material, the water is introduced through the inlet tube which is held in place by the inclined shield, as described. After leaving the lower end of the inlet tube the water passes upward through the filtering material until it reaches the plane of the top of the outlet tube, from whence it flows to the receptacle. In this way the body of the vessel is entirely filled, during use, to a point corresponding with the upper end of the outlet tube, with water, but after the cessation of the rain or the checking of the supply the water contained in the vessel will flow through the perforated or reticulated guards and thus drain the device in order that the water may not remain and become stale in the vessel.

It will be understood that the peculiar shape of the outlet openings whereby the water passes from the inlet tube to the body of the vessel causes leaves and dirt to accumulate in the inlet tube, and, therefore, by the removal of said tube the operator is enabled to cleanse the device and prevent the obstruction of the passages. The shield maintains the filtering material in position during the absence of the inlet tube.

The cap of the vessel is conical in shape to act as a water-shed, and the flared or upstruck edges of the opening 3, therein, prevent the entrance of dirt, water, &c., at this point.

Having described my invention, what I claim is—

1. In a filter, the combination with a vessel adapted to contain a filtering material and provided with a suitable outlet tube, of a tubular shield extending from the top to the bottom of the vessel and provided at its lower end with suitable openings, and an inlet tube removably fitted in said shield and provided in its lower end with openings to register with those in the shield, substantially as specified.

2. In a filter, the combination with a vessel adapted to contain a filtering material, of an inlet tube removably fitted in the vessel and extending to the bottom thereof, and an outlet tube terminating at its upper end adjacent to the top of the vessel, communicating with an opening in the bottom of the vessel and provided in its sides and adjacent to the bottom of the vessel with perforated or reticulated guards whereby the interior of the vessel is drained after the supply is checked, substantially as specified.

3. In a filter, the combination with a vessel adapted to contain a filtering material and provided with an outlet tube which communicates with an opening in the bottom of the vessel and terminates at its upper end adjacent to the top of the same, of a conical cap removably fitted upon the top of the vessel and provided near one edge with an opening 3 with upstruck or flared flanges, an inclined tubular shield fixed in the vessel in registration with said opening in the cap and provided at its lower end with openings, and an inlet tube fitted in the registering opening of the cap and shield, whereby the flanges of said opening lie in contact with the surface of the tube, substantially as specified.

In testimony that I claim the foregoing as my own I have hereto affixed my signature in the presence of two witnesses.

JAMES H. PITMAN.

Witnesses:
H. MENDEL,
L. B. JOHNSON.